United States Patent [19]

Goebel

[11] Patent Number: 4,956,998

[45] Date of Patent: Sep. 18, 1990

[54] APPARATUS FOR DRIVING A MOTOR VEHICLE WHEEL FOR DETERMINING UNBALANCE THEREOF

[75] Inventor: Eickhart Goebel, Pfungstadt, Fed. Rep. of Germany

[73] Assignee: Hofmann Werkstatt-Technik GmbH, Pfungstadt, Fed. Rep. of Germany

[21] Appl. No.: 388,002

[22] Filed: Aug. 2, 1989

[30] Foreign Application Priority Data

Aug. 24, 1988 [DE] Fed. Rep. of Germany ....... 3828724

[51] Int. Cl.$^5$ .............................................. G01M 1/28
[52] U.S. Cl. .......................................... 73/457; 74/16
[58] Field of Search ................................ 73/457; 74/16

[56] References Cited

U.S. PATENT DOCUMENTS 3,483,764 12/1969 Hunter .................................. 73/457
3,688,590 9/1972 Bjorn et al. ............................ 74/16

Primary Examiner—John Chapman
Attorney, Agent, or Firm—Cushman, Darby & Cushman

[57] ABSTRACT

An apparatus for driving a motor vehicle wheel while it is fitted to the motor vehicle for detecting unbalance thereof comprises a friction wheel which is driven by a drive motor and which is pressed against the motor vehicle wheel for driving same at a speed required for measuring its unbalance. The drive motor is switched on or off in dependence on the pressure force with which the friction wheel is pressed against the motor vehicle wheel, in such a way that no slip occurs between the friction wheel and the motor vehicle wheel.

12 Claims, 2 Drawing Sheets

APPARATUS FOR DRIVING A MOTOR VEHICLE WHEEL FOR DETERMINING UNBALANCE THEREOF

BACKGROUND OF THE INVENTION

The present invention generally concerns the field of determining unbalance of a motor vehicle wheel and more particularly relates to an apparatus for driving a motor vehicle wheel while it is mounted on the motor vehicle, for the purposes of determining unbalance thereof.

Unbalance measuring machines for determining unbalance of a motor vehicle wheel while it is still mounted on the motor vehicle are generally in the form of easily manoeuvreable units, the use of which is particularly desirable and meaningful in situations such that removing the wheel from the motor vehicle would involve a relatively large amount of work. Such circumstances arise for example when measuring the unbalance of the heavy wheels of motor buses or trucks. Such an unbalance measuring machine can also be used to detect whether the wheel while still mounted on the motor vehicle has any substantial unbalance at all or whether, if the wheel suffers from a minor degree of unbalance, an improvement in the degree of smoothness with which the wheel rotates can be achieved by eliminating the minor unbalances to be found thereon. The unbalance measuring machine of that kind may also be appropriately used in a situation in which a wheel which has already been balanced on a stationary balancing machine has to be checked and possibly rebalanced again after it has been fixed to the motor vehicle in question, as it frequently happens that, when a motor vehicle wheel which has been balanced separately is then fitted to the motor vehicle, it may suffer from unbalance arising for example out of parts of the vehicle which rotate with the balanced wheel.

In order to carry out an unbalance measuring operation on a wheel while it is still fixed to the motor vehicle, the wheel to be measured is generally lifted, for example by means of a jack, to ensure that the wheel can be freely rotated in the unbalance-measuring run. In order to drive the wheel in rotation at the necessary speed, a typical unbalance measuring machine of that kind has a friction wheel which is driven by means of a drive motor and which is pressed against the tire on the wheel to drive it at the necessary speed of rotation for carrying out the unbalance measuring operation. In that situation the drive motor of the machine may be switched on before or after the friction wheel has been brought into contact with the tire.

It is found in some cases that there is no guarantee that the pressure force with which the friction wheel of the unbalance measuring machine is pressed against the tire of the motor vehicle wheel to be balanced is sufficient to transmit the drive torque produced by the drive motor to the wheel, without slippage between the friction wheel and the tire. It will be appreciated however that slippage-free drive for the wheel is desirable in particular to protect the tire from wear which would occur in the event of slippage between the friction wheel and the tire. Slippage of that kind may also occur in the wheel deceleration phase after the drive motor of the machine has been switched off, at the end of an unbalance measuring operation. Furthermore, if the motor is still switched on and the friction wheel is subjected to a braking effect, that can result in the motor being overloaded.

SUMMARY OF THE INVENTION

An object of the present invention is to provide an apparatus for driving a motor vehicle wheel while mounted on a motor vehicle, for the purposes of determining unbalance of the wheel, which does not suffer from the above-discussed disadvantages of the prior machines.

Another object of the invention is to provide an apparatus for driving a motor vehicle wheel while mounted to a motor vehicle, to determine unbalance thereof, which is adapted to ensure that the wheel to be measured is accelerated and braked in such a fashion as to reduce the likelihood of damage to the wheel and/or a tire thereon.

Still another object of the invention is to provide an unbalance measuring apparatus for determining unbalance of motor vehicle wheel while it is still fitted to a motor vehicle, which is easy to operate while providing a reliable unbalance measuring procedure.

In accordance with the present invention these and other objects are achieved by an apparatus for driving a motor vehicle wheel while it is fitted to a motor vehicle, in particular being jacked up, for the purposes of determining unbalance thereof, comprising a drive motor and a friction wheel adapted to be driven by the drive motor. The friction wheel can be pressed against the motor vehicle wheel to drive same at a speed of rotation required for the unbalance measuring operation. The drive motor is adapted to be switched on and off in dependence on the pressure force with which the friction wheel is pressed against the motor vehicle wheel. The pressure force is of such a magnitude that, when the drive motor is switched on, the drive torque produced thereby is transmitted in a slip-free manner to the motor vehicle wheel while when the drive motor is switched off a reduced drive moment or a braking moment is also transmitted in a slip-free manner to the wheel.

It will be seen therefore that that structure provides that, when the drive motor is switched on, the friction wheel is pressed against the tire of the wheel to be measured, with such a high pressure force as to ensure that the wheel is accelerated without slip to the speed of rotation required for the unbalance measuring operation. Because the drive motor can be switched on in dependence on that pressure force, thereby defining a threshold which can be referred to as the switching-on threshold, the drive motor will be automatically switched on when the required pressure force is attained. In order for the motor to be switched off, the pressure force is reduced and when that pressure force reaches a suitable threshold which can be referred to as the switching-off threshold, that pressure force is still just sufficient to provide for slip-free transmission of the reduced drive moment which is now transmitted by the de-activated motor, or a braking moment which is produced by the motor or in some other fashion.

Therefore, the threshold value for the pressure force, at which the drive motor is switched on, is advantageously higher than the threshold value of the pressure force at which the drive motor is switched off.

In order to prevent the motor from being continuously switched on and off due to geometrical irregularities in the wheel, in particular due to tire run-out or distortion, for example lateral run-out, the first and second threshold values in respect of the pressure force, and the difference between the first and second threshold values, are desirably such that a periodically recurring fluctuation in the pressure force, which results from a geometrical irregularity as referred to above, lies between the first and second pressure force threshold values. In that way, any hysteresis effect in respect of the drive wheel, which results from irregularity of the motor vehicle wheel being driven thereby, does not have a disadvantageous effect on the drive produced by the drive motor. As a result, the motor does not suffer from being continuously switched on and off.

For the purposes of detecting the pressure force applied as between the friction drive wheel of the apparatus and the motor vehicle wheel to be driven thereby, the apparatus preferably has a force sensor which more particularly may be in the form of a pressure force sensor. The force sensor is preferably operatively associated with a mounting arrangement for mounting the friction wheel of the apparatus. The mounting arrangement may be for example in the form of a pivotable carrier plate which carries both the drive motor and also the friction wheel which is fixed on the motor shaft. The support structure for the friction wheel or for the drive unit consisting of the motor and the friction wheel can be biased in the direction in which the friction wheel is pressed against the motor vehicle wheel, by means of a compression spring which is supported against the housing or a housing frame structure of the apparatus. By measuring the travel movement of the carrier structure, such movement being proportional to the pressure force with which the friction wheel is pressed against the motor vehicle wheel to be measured, it is then possible to establish the first and second threshold values, namely the switching-on threshold and the switching-off threshold for the drive motor.

In order to produce the necessary pressure force, a two-armed lever may be pivotably mounted on the housing o housing frame structure of the measuring apparatus. The measuring apparatus can be mounted on wheels and can thus be moved into a position in which the friction wheel suitably bears against the motor vehicle wheel in question. The two-armed lever has a first short lever arm which is adapted to be brought into driving engagement with the apparatus wheels by pivotal movement of the lever by means of the longer lever arm. In that way, the friction wheel can be suitably pressed against the tire of the motor vehicle wheel to be measured, by applying a relatively low force, which can be a manual force, by way of the longer lever arm of the lever. When the switching-on threshold in respect of the pressure force is reached, the drive motor is then activated.

Further objects, features and advantages of the present invention will be apparent from the following description of a preferred embodiment of the invention.

DESCRIPTION OF THE PREFERRED EMBODIMENT

Figure 1:
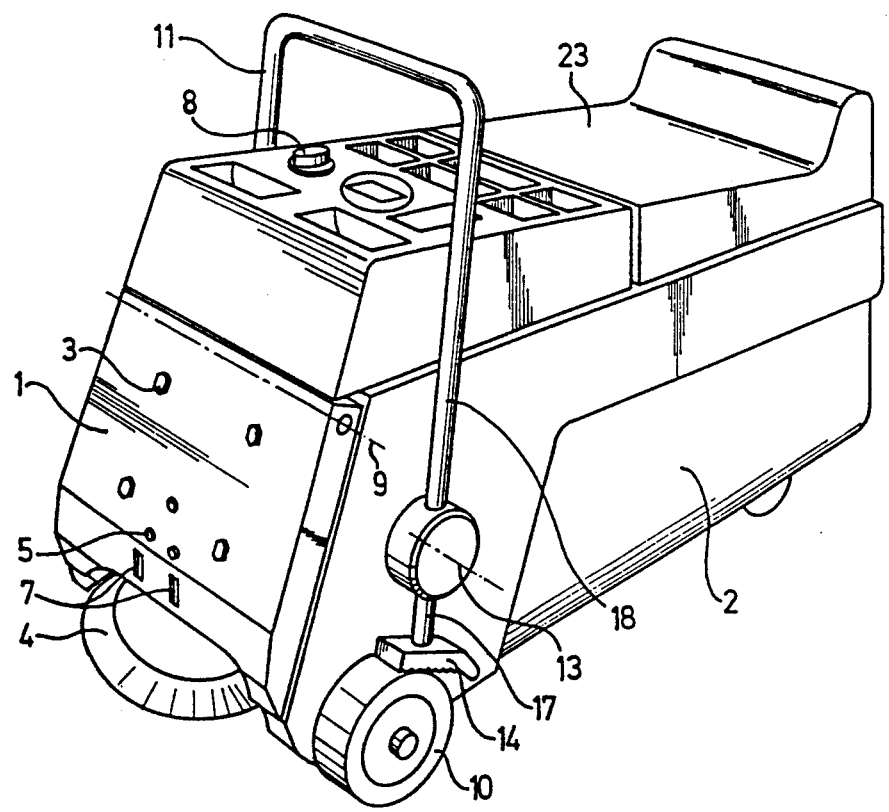
FIG. 1 is a perspective view of an embodiment of the apparatus to the invention.
Figure 2:
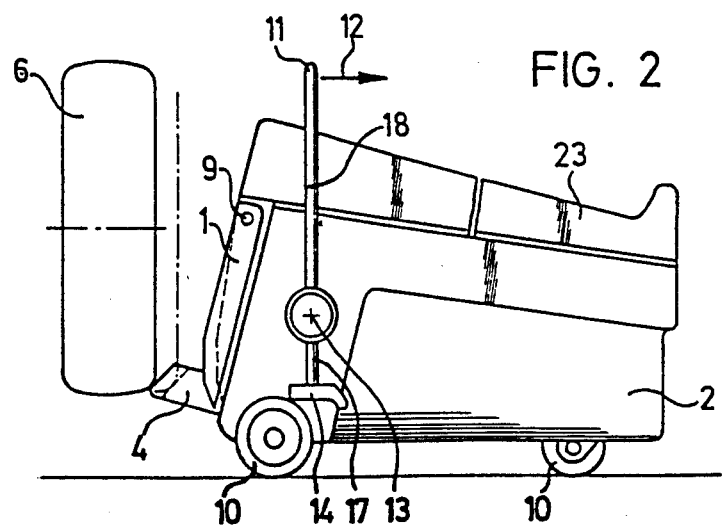
FIG. 2 is a side view of the apparatus shown in FIG. 1.

FIGS. 1 and 2 show an unbalance measuring machine comprising a housing 2 which is movably supported on wheels 10 and which can be used for the purposes of measuring unbalance of a freely rotatable motor vehicle wheel which is indicated at 6 in FIG. 2, while the wheel 6 is still mounted on a motor vehicle (not shown). For that purpose the motor vehicle is suitably lifted, for example on a jack.

Figure 3:
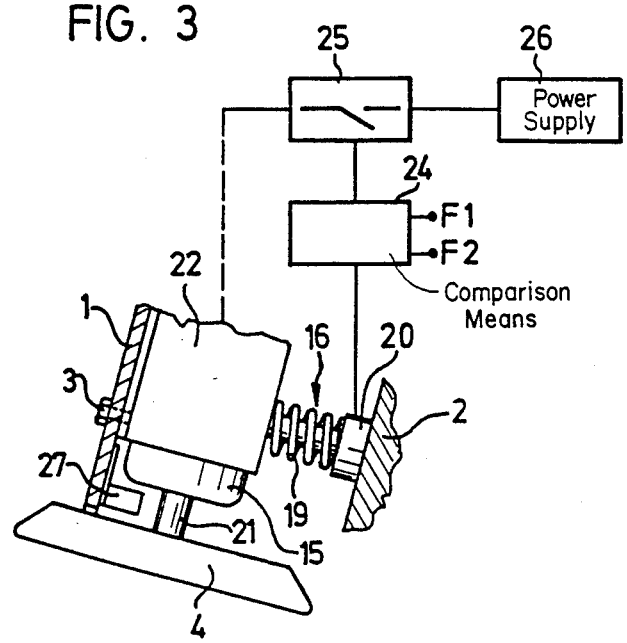
FIG. 3 is a simplified view in the form of a block circuit diagram of an embodiment of a pressure sensor with motor control means connected thereto, which can be used in the construction shown in FIGS. 1 ad 2.

The unbalance measuring apparatus has a friction wheel 4 which, as shown in FIG. 3, is secured to a shaft 21 of a drive motor 15. The drive motor 15 is secured by means of a motor mounting arrangement 22 to the inward side of a front plate of the housing 2, the front plate serving as a carrier member as indicated at 1 for the drive unit consisting of the drive motor 15 and the friction wheel 4. The motor mounting 22 is secured to the carrier member 1 by suitable means such as screws 3.

The front plate forming the carrier member 1 is mounted to the housing 2 pivotably about a pivot axis as indicated at 9 in FIGS. 1 and 2, at the front side of the housing 2 which is towards the motor vehicle wheel 6 to be measured. The pivot axis 9 is disposed at the upper part of the front plate or carrier member 1 which thus extends downwardly from the pivot axis 9. Provided at the bottom end of the front plate or carrier member 1 is an opening through which the friction wheel 4 partially projects, as can be clearly seen from FIGS. 1 and 2. The projecting part of the friction wheel 4 can be brought into the direct vicinity of the motor vehicle wheel 6 to be measured, in the manner shown in FIG. 2, and can thus be pressed against the motor vehicle wheel 6, in a manner which will be described in greater detail hereinafter.

Looking now at FIG. 3, an optical sensing arrangement 27 can be secured to the back of the front plate or carrier member 1 by means of screws or bolts indicated generally at 5 in FIG. 1. The optical sensing arrangement 27 optically senses the driven motor vehicle wheel 6 through two slots indicated at 7 in FIG. 1, when determining the angular position of the unbalance of the wheel. The apparatus further includes a selector switch indicated at 8 in FIG. 1 for preselecting the mode of operation to be used for the drive arrangement consisting of the drive motor 15 and the friction wheel 4. In that way it is possible to select the direction in which the motor vehicle wheel 6 is to be driven in the unbalance measuring operation.

Figure 4:
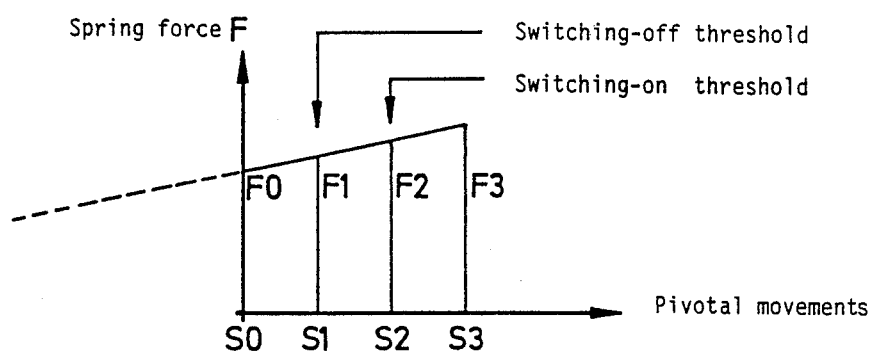
FIG. 4 shows a curve illustrating the mode of operation of the pressure sensor shown in FIG. 3.

As shown in FIG. 3, the front plate forming the carrier member 1 is biased towards the motor vehicle wheel 6 to be measured, by way of a compression spring 19 which in the rest position produces a biasing force which is indicated at FO in FIG. 4. Arranged between the motor mounting 22 which also provides the mounting for the friction wheel 4, and the housing 2 or a motor frame structure which is fixedly connected to the housing 2, is a travel measuring device 20 which measures displacement of the friction wheel 4 when it is pressed against the motor vehicle 6 to be measured, as will be described in greater detail hereinafter. The compression spring 19 also bears against the above-mentioned motor frame structure or the housing 2. In the illustrated embodiment the compression spring 19 is engaged between the motor mounting 22 and the housing frame structure or housing as indicated at 2. Reference numeral 16 indicates the pressure sensor formed by the compression spring 19 and the travel measuring device 20, which can also be arranged directly between the carrier member 1 and the housing frame structure or housing 2.

Referring now again to FIGS. 1 and 2, a two-armed lever 11 is also mounted on the housing 2. Provided at the end of the shorter lever arm 17 of the lever 11 are drive shoes 14 which come into engagement with the front runner wheels 10 of the apparatus upon pivotal movement of the lever 11 in the direction indicated by the arrow 12, with the lever 11 being pivoted by means of the longer lever arm 18. As can be seen in particular from FIG. 1, the lever 11 is of a loop-like configuration and is mounted to the housing 2 at a pivot axis indicated at 13. The shoes 14 are provided at both sides of the housing 2. Likewise, a short lever arm 17 and a long lever arm 18 are provided at each of the two sides of the housing 2.

The general structure of the apparatus according to the invention having been described, the mode of operation of the embodiment illustrated in the drawings will now be described in greater detail:

With the motor 15 in an inactive condition, that is to say with the friction wheel 4 stationary, the illustrated apparatus is rolled on the runner wheels 10 towards the motor vehicle wheel 6 until the friction wheel 4 comes to bear against the motor vehicle wheel 6, in the first position thereof as shown in solid lines in FIG. 2. An operator can sit on a seat 23 and conveniently operate the loop-like lever 11. When the lever 11 is pivoted in the direction indicated by the arrow 12 in FIG. 2, the shoes 14 come into driving engagement with the front runner wheels 10 so that the apparatus is then rolled closer towards the motor vehicle 6 to be measured. In that situation, the front plate which serves as the carrier member 1 for the drive unit consisting of the drive motor 15 and the friction wheel 4 is pivoted about the pivot axis 9 against the biasing force FO of the compression spring 19 so that the friction wheel 4 moves towards the position shown in broken lines in FIG. 2; in that position however the friction wheel 4 is pressed with a progressively greater force against the motor vehicle wheel 6 which is shown in broken lines.

FIG. 4 shows the increasing pressure force produced by the compression spring 19, corresponding to the spring force indicated at F in FIG. 4. The compression spring experiences deformation in that situation, and the amount by which the compression spring 19 is deformed, that is to say compressed, which corresponds to the pivotal movement of the front plate or carrier member 1, as indicated at s in FIG. 4, is detected by the travel measuring device 20 which produces an electrical output signal which is proportional to the pivotal movement s which is in the millimeter range. The output signal from the device 20 is also proportional to the pressure force imparted by the compression spring 19, with which the friction wheel 4 is pressed against the tire of the motor vehicle wheel 6. As the optical, sensing means 27 is arranged at the back of the front plate of carrier member 1, the optical sensing means 27 which ascertains the angular position of the unbalance of the motor vehicle wheel 6 in the measuring run also moves with the front plate or carrier member 1 in the pivotal movement thereof so that the optical sensing means 27 always remains in the desired position in relation to the motor vehicle wheel 6 to be measured.

As shown in FIG. 3, the output signal from the device 20 is passed to a comparison means 24. A switching-on threshold value F2 (see also FIG. 4) in respect of the pressure force at which no further slippage occurs between the friction wheel 4 and the tire of the motor vehicle wheel in the unbalance measuring operation is also inputted into the comparison means 24. As soon as the electrical signal produced by the device 20 corresponds to the threshold value F2, the comparison means 24 outputs an output signal by means of which a switch device 25 is switched into the closed condition. The switch device 25 can be in particular in the form of a relay and is normally in an open condition. Closure of the switch 25 closes a circuit and the drive motor 15 is supplied with power and activated by way of the closed switch 25, by a power supply device 26. When the motor is switched on, the motor vehicle wheel 6 is accelerated to the desired speed of rotation for the unbalance measuring operation, without slippage, by way of the friction wheel 4 which is pressed against the tire of the wheel 6. The pressure force can be increased to a final value of F3 in FIG. 4 by further pivotal movement of the lever 11 in the direction indicated by the arrow 12 in FIG. 2.

To terminate the measuring operation, the lever 11 is pivoted in the opposite direction to the arrow 12 in FIG. 2 so that the pressure force imparted by the compression spring 19 is reduced and reaches a switching-off threshold value indicated at F1 in FIG. 4. At that switching-off threshold value, the travel measuring device 20 outputs an electrical signal which corresponds to the pivotal movement S1 and which is compared in the comparison means 24 to a value corresponding to the switching-off threshold value F1. When that value is reached the switch 25 is switched into the open condition, thereby interrupting the supply of power to the drive motor 15. The pressure force with which the friction wheel 4 is pressed against the motor vehicle wheel 6, at the switching-off threshold value F1, is such that no slip occurs with the braking moment which is then produced or with the reduction in drive moment which then takes place.

The switching stroke movement or the difference between the threshold value F1 and the threshold value F2 is such that, even with maximum tire run-out or deflection, the drive motor 15 does not suffer from being continuously switched on and off and a hysteresis effect in respect of the friction wheel 4, caused by tire run-out, has no effect on the operation of the apparatus.

It will be appreciated that the above-described apparatus has been set forth solely by way of example and illustration of the principles of the present invention and that various alterations and modifications may be made therein without thereby departing from the spirit and scope of the invention.

I claim:

1. Apparatus for driving a motor vehicle wheel while it is fitted to the motor vehicle for the purposes of determining unbalance thereof, comprising a drive motor; a friction wheel adapted to be driven by the drive motor; means for pressing the friction wheel against the motor vehicle wheel for driving same at a speed of rotation required for an unbalance measuring operation; and means for switching the drive motor on and off in dependence on the pressure force with which the friction wheel is adapted to be pressed against the motor vehicle wheel, the pressure force being of such a magnitude as to provide for substantially slip-free transmission of torque between the friction wheel and the motor vehicle wheel both when the drive motor is switched on and when it is switched off.

2. Apparatus as set forth in claim 1 which provides first and second threshold values for said pressure force and wherein the drive motor is switched on at the higher of the threshold values and switched off at the lower of the threshold values.

3. Apparatus as set forth in claim 2 wherein the first and second threshold values and the difference between the threshold values are such that a periodically recurring fluctuation in said pressure force which results from a geometrical irregularity of the motor vehicle wheel lies within the range defined by the first and second threshold values.

4. Apparatus as set forth in claim 1 including a force sensor for measuring the pressure force, the force sensor being coupled to means mounting the friction wheel.

5. Apparatus as set forth in claim 4 wherein said force sensor is in the form of a compression force sensor.

6. Apparatus as set forth in claim 4 wherein the force sensor comprises a travel measuring means adapted to be actuated when the friction wheel is pressed against the motor vehicle wheel, thereby to detect a measured stroke movement which is proportional to the pressure force with which the friction wheel is pressed against the motor vehicle wheel, and a compression spring arranged to urge the friction wheel towards the unactuated position thereof.

7. Apparatus as set forth in claim 4 and further including a wherein the force sensor engages said carrier member.

8. Apparatus as set forth in 7 including a housing structure, wherein said carrier member comprises a front plate pivotably mounted to said housing structure at a position in which it faces towards said motor vehicle wheel to be measured.

9. Apparatus as set forth in claim 7 and including an optical sensing means for sensing the motor vehicle wheel to be measured, the sensing means being secured to the carrier member.

10. Apparatus as set forth in claim 1 and including a housing structure supported on wheels and carrying the friction wheel and the drive motor, and a lever which is pivotably mounted to said housing structure, the lever comprising a first lever arm and a second longer lever arm wherein the first lever arm is adapted to be brought into driving engagement with the wheels on the housing structure to move the housing structure upon pivotal movement of the second longer lever arm which is adapted to be actuated by hand.

11. Apparatus as set forth in claim 10 wherein said second lever arm is adapted to be actuated to produce the respective pressure force required for the friction wheel to be pressed against the motor vehicle wheel to be measured.

12. Apparatus as set forth in claim 1 and including an optical sensing means for sensing the motor vehicle wheel to be measured.

* * * * *